United States Patent
Tarau et al.

(10) Patent No.: US 11,535,407 B1
(45) Date of Patent: Dec. 27, 2022

(54) THERMAL MANAGEMENT SYSTEM

(71) Applicant: ADVANCED COOLING TECHNOLOGIES, INC., Lancaster, PA (US)

(72) Inventors: Calin Tarau, Downingtown, PA (US); Kuan-Lin Lee, Exton, PA (US); William Anderson, Bound Brook, NJ (US)

(73) Assignee: Advanced Cooling Technologies, Lancaster, PA (US)

(*) Notice: Subject to any disclaimer, the term of this patent is extended or adjusted under 35 U.S.C. 154(b) by 260 days.

(21) Appl. No.: 16/814,307

(22) Filed: Mar. 10, 2020

Related U.S. Application Data

(60) Provisional application No. 62/821,617, filed on Mar. 21, 2019.

(51) Int. Cl.
| | |
|---|---|
| *B64G 1/50* | (2006.01) |
| *F25B 19/00* | (2006.01) |
| *F25B 45/00* | (2006.01) |
| *F25B 41/20* | (2021.01) |
| *F25B 27/02* | (2006.01) |

(52) U.S. Cl.
CPC ................ *B64G 1/50* (2013.01); *F25B 19/00* (2013.01); *F25B 41/20* (2021.01); *F25B 45/00* (2013.01); *F25B 27/02* (2013.01)

(58) Field of Classification Search
CPC .......... F25B 19/00; F25B 41/20; F25B 45/00; F25B 27/02; B64G 1/50
See application file for complete search history.

(56) References Cited

U.S. PATENT DOCUMENTS

| | | | | |
|---|---|---|---|---|
| 3,919,162 A | * | 11/1975 | Austin | B22C 9/123 523/145 |
| 5,048,301 A | * | 9/1991 | Sabin | F25D 5/00 62/101 |
| 5,079,932 A | * | 1/1992 | Siegel | F25B 17/08 62/293 |
| 5,197,302 A | * | 3/1993 | Sabin | F25B 17/08 62/101 |
| 5,560,821 A | * | 10/1996 | Leo | E03F 11/00 210/143 |
| 5,804,760 A | * | 9/1998 | Flynn | C06B 47/02 149/1 |
| 6,105,368 A | * | 8/2000 | Hansen | F01K 25/065 60/646 |
| 6,360,730 B1 | * | 3/2002 | Koethe | B64D 37/32 123/541 |

(Continued)

*Primary Examiner* — Kun Kai Ma
(74) *Attorney, Agent, or Firm* — McNees Wallace & Nurick

(57) ABSTRACT

A thermal management system adapted to vent a two-phase working fluid into an environment having a higher pressure than a vapor pressure of a working fluid corresponding to a set point of the system including a secondary vessel containing a secondary species. The system includes a primary vessel containing the working fluid and the secondary species, and at least one valve to selectively control venting of a mixture of the working fluid and the secondary species from the primary vessel to the environment. The system includes at least one valve connected between the primary vessel and the secondary vessel to selectively control charging of the secondary species into the primary vessel.

20 Claims, 15 Drawing Sheets

(56) References Cited

U.S. PATENT DOCUMENTS

| | | | | |
|---|---|---|---|---|
| 6,651,653 | B1* | 11/2003 | Honkonen | F25J 1/0212 128/201.21 |
| 6,739,131 | B1* | 5/2004 | Kershaw | F01B 21/00 417/379 |
| 7,452,625 | B2* | 11/2008 | Malhotra | H01M 8/1011 429/410 |
| 2002/0096049 | A1* | 7/2002 | Funke | C01B 7/0743 95/117 |
| 2003/0072698 | A1* | 4/2003 | MacArthur | B01D 21/26 422/600 |
| 2006/0243207 | A1* | 11/2006 | Jursich | C23C 16/45512 118/715 |
| 2007/0193300 | A1* | 8/2007 | Tilton | H01L 23/427 62/475 |
| 2007/0199941 | A1* | 8/2007 | Reese | F17C 3/02 220/560.1 |
| 2011/0308765 | A1* | 12/2011 | Kumar | H01M 10/6565 165/47 |
| 2015/0033765 | A1* | 2/2015 | Blalock | F17C 5/04 62/6 |
| 2015/0344145 | A1* | 12/2015 | Epstein | F02C 7/224 244/135 C |
| 2016/0355770 | A1* | 12/2016 | Norkin | C12G 3/02 |
| 2018/0273155 | A1* | 9/2018 | Brutoco | B64B 1/58 |

* cited by examiner

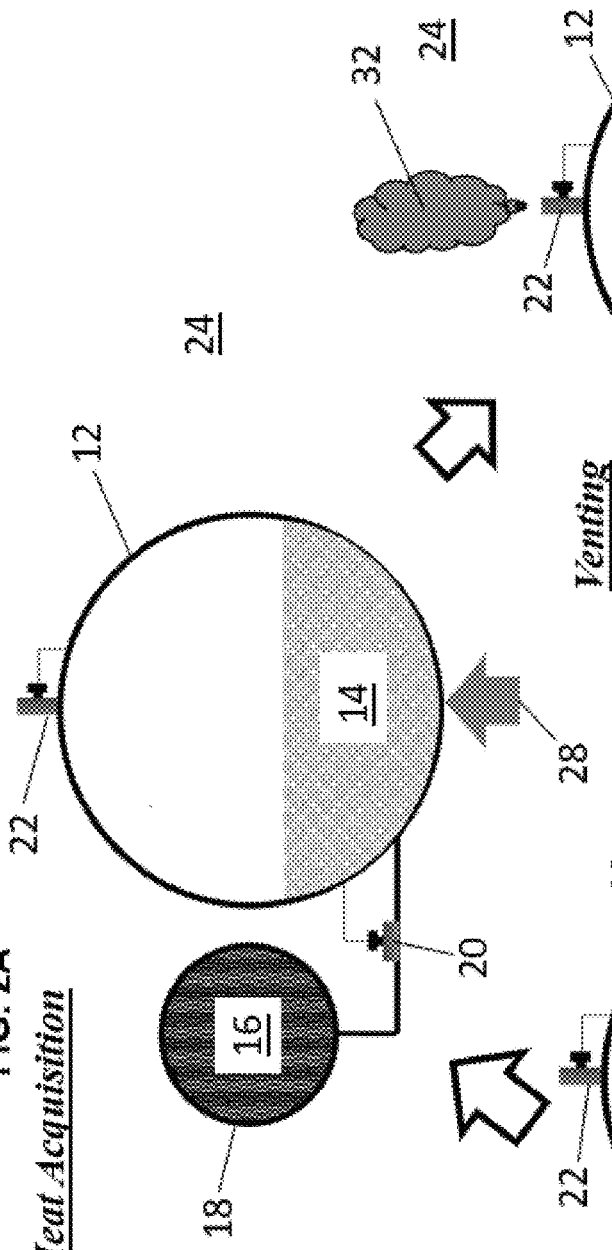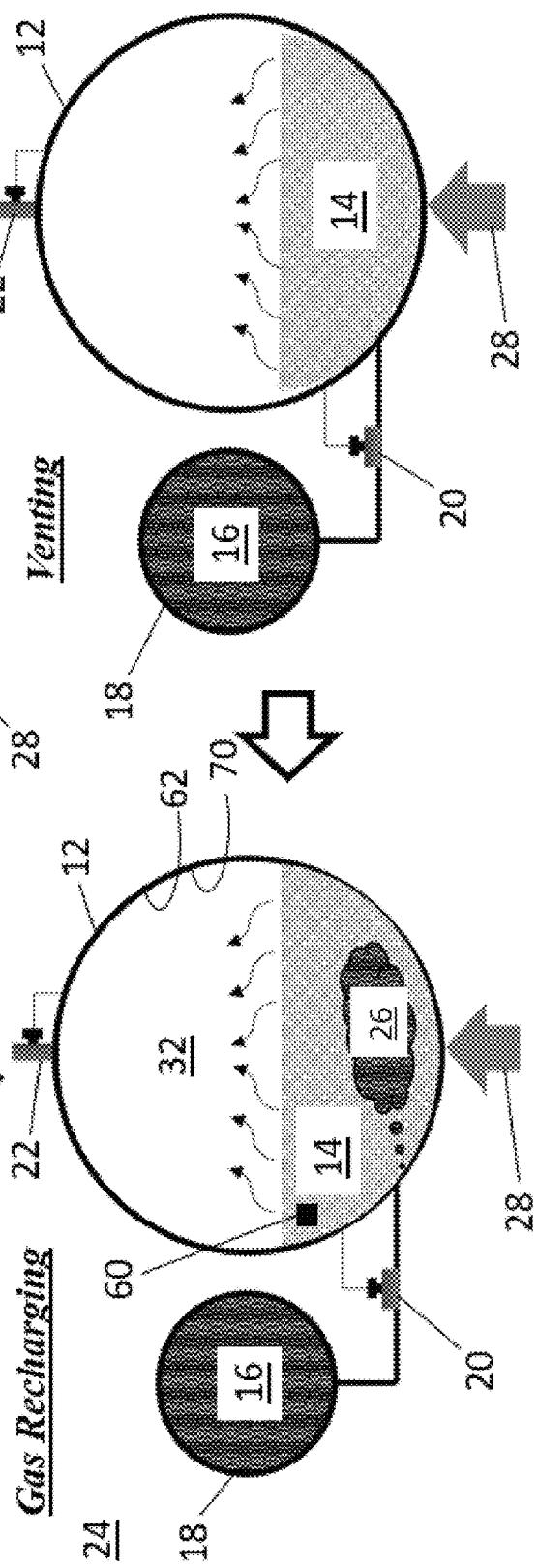

THERMAL MANAGEMENT SYSTEM

CROSS REFERENCE TO RELATED APPLICATIONS

This application relates to and claims the benefit of U.S. Provisional Patent Application No. 62/821,617, filed Mar. 21, 2019, entitled "Thermal Management System," the disclosure of which is incorporated by reference in its entirety.

FIELD OF THE INVENTION

The present invention is directed to the field of heat transfer devices, and in particular, for thermal management systems having venting-based cooling.

BACKGROUND OF THE INVENTION

In-situ exploration of celestial bodies has been ranked as one of the highest priorities for future inner solar system studies. Such in-situ exploration may involve an extremely hostile environment, posing a significant challenge to design a thermal management system. For example, in the solar system, celestial body surface temperatures may reach or exceed 460° C. and atmospheric pressures approaching or exceeding 92 bar, making it extremely difficult to reject the waste heat generated by the electronics inside landers to the surrounding environment. Future celestial body surface exploration missions require landers to be able to survive and operate in extreme environments for a sufficient duration, such as at least 24 hours. To achieve this goal, a low mass, robust thermal management system that will maintain the electronics temperature within a lander for the required time duration is needed.

Aircraft and materiel also have a problem with limited heat sinks. Thermal management is becoming increasingly difficult for state-of-the-art aircraft. In fact, thermal management has been identified as the most difficult challenge associated with advanced aircraft design. The difficulty lies with the lack of available sinks, which are limited due to the low thermal conductivity of composite skins, high-altitude and high-speed operation, and Low Observability (LO) requirements. As a result, aircraft fuel becomes the most attractive sink. In normal operation, waste heat collected by the fuel is rejected by burning this fuel in the engine. However, the fuel aircraft heat sink is oversubscribed with current tactical aircraft. The problem will increase in the future, as additional, high power electronics are added to the aircraft, requiring additional cooling.

Materiel often has no method to reject heat to the environment, and must find a method to store the heat in the materiel during operation.

Phase Change Material (PCM) is a substance with a high latent heat of fusion, which melts and solidifies at a specific temperature. PCM has been consistently used in celestial body lander thermal management systems as a primary heat sink to absorb the waste heat generated from the instrumentation inside the landers. For the incoming heat leak of the surrounding celestial body environment, multi-layer insulation (MLI) or aerogel insulation were commonly applied on both interior and exterior surface of a lander shell structure. A PCM-based thermal management system to achieve 24 hours survival lander is extremely heavy. A trade study performed for the above celestial body for such a surface temperature of 460° C. predicted it will require at least 255 kg of PCM (lithium salts) and 110 kg of insulation to keep the electronics temperature within a lander below 70° C. for 24 hours on the celestial body surface.

Another concept of venting a two-phase working fluid (e.g., ammonia) into the cited celestial body atmosphere to achieve effective cooling was proposed. The lowest temperature that can be achieved through venting ammonia vapor into a 92 bar high pressure environment is at 121° C., so the evaporative cooling of ammonia venting can only be used to manage the incoming environmental heat leaks while the internal electronic heat load is cooled by the sensible heat of ammonia liquid from 0° C. to 70° C.

One method to cool aircraft avionics directs aircraft fuel through channels built into the electronics enclosure. Within the enclosure, the electronics are mounted on stacked boards that are separated by a support structure. Waste heat generated by the electronics and absorbed from the hot engine environment is transported to fuel channels primarily by conduction through the aluminum support structure. However, this heat sink is already oversubscribed. Modern tactical aircraft must land before the fuel tanks are empty, since a minimum amount is required to circulate through the electronics.

A second method to provide cooling for materiel and aircraft is to vent a fluid overboard. Typically, the fluid travels over the electronics and vaporizes, so a saturated vapor is vented from the aircraft. One limitation is that the fluid cannot be vented when the atmospheric pressure is higher than the saturated fluid pressure at the desired cooling temperature, particularly on the ground. Ammonia can be vented, even on the ground. However, ammonia is extremely toxic, and vented ammonia could harm the maintenance crew. In addition, the ammonia may be detectable in flight.

There is a need in the art for thermal management systems usable in high temperature and pressure applications that do not suffer from the above-mentioned drawbacks.

SUMMARY OF THE INVENTION

The primary restriction of thermal management systems having venting-based cooling is that the vapor pressure of working fluid at the set point must be higher than the environmental pressure, which limits the working fluid selection for certain conditions. For example, there is no working fluid that is capable of being vented into ambient pressure at 92 bar with a saturation temperature at 70° C. The venting-based cooling system can operate in an environment having a pressure that is higher than the vapor pressure corresponding to the set point. This is achieved by elevating the total pressure of a venting vessel through the addition of a secondary species (i.e., non-condensable gas) into the venting vessel that is charged with working fluid at saturation. The resulting total pressure consisting of vapor saturation pressure and gas partial pressure will be higher than the environmental pressure. By venting this mixture (saturated working fluid and the secondary species) into the high-pressure environment, the waste heat of the payload can be effectively rejected through working fluid vaporization. In certain situations, when the environment is not only at higher pressure than the saturation pressure at set point, but is also warmer than the set point, the vented mixture leaving the vessel can be further used to collect and reject incoming environmental heat leaks by its sensible heat capacity before being ultimately vented into the environment, sometimes referred to as heat guarding. Advantages of the invention include: simplicity, lightweight/low mass, no moving parts other than valves, passive and only minimal energy needs (e.g., to activate valves).

In one embodiment, a thermal management system adapted to vent a two-phase working fluid into an environment having a higher pressure than a vapor pressure of a working fluid corresponding to a set point of the system, including a secondary vessel containing a secondary species, and a primary vessel containing the working fluid and the secondary species. The system further includes at least one valve to selectively control venting of a mixture of the working fluid and the secondary species from the primary vessel to the environment. The system further includes at least one valve connected between the primary vessel and the secondary vessel to selectively control charging of the secondary species into the primary vessel.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 2A is a schematic representation of the thermal management system of FIG. 1 operating in a heat acquisition cycle.

FIG. 2B is a schematic representation of the thermal management system of FIG. 1 operating in a venting cycle.

FIG. 2C is a schematic representation of the thermal management system of FIG. 1 operating in a secondary fluid recharging cycle.

Wherever possible, the same reference numbers will be used throughout the drawings to represent the same parts.

DETAILED DESCRIPTION OF THE INVENTION

Figure 1:
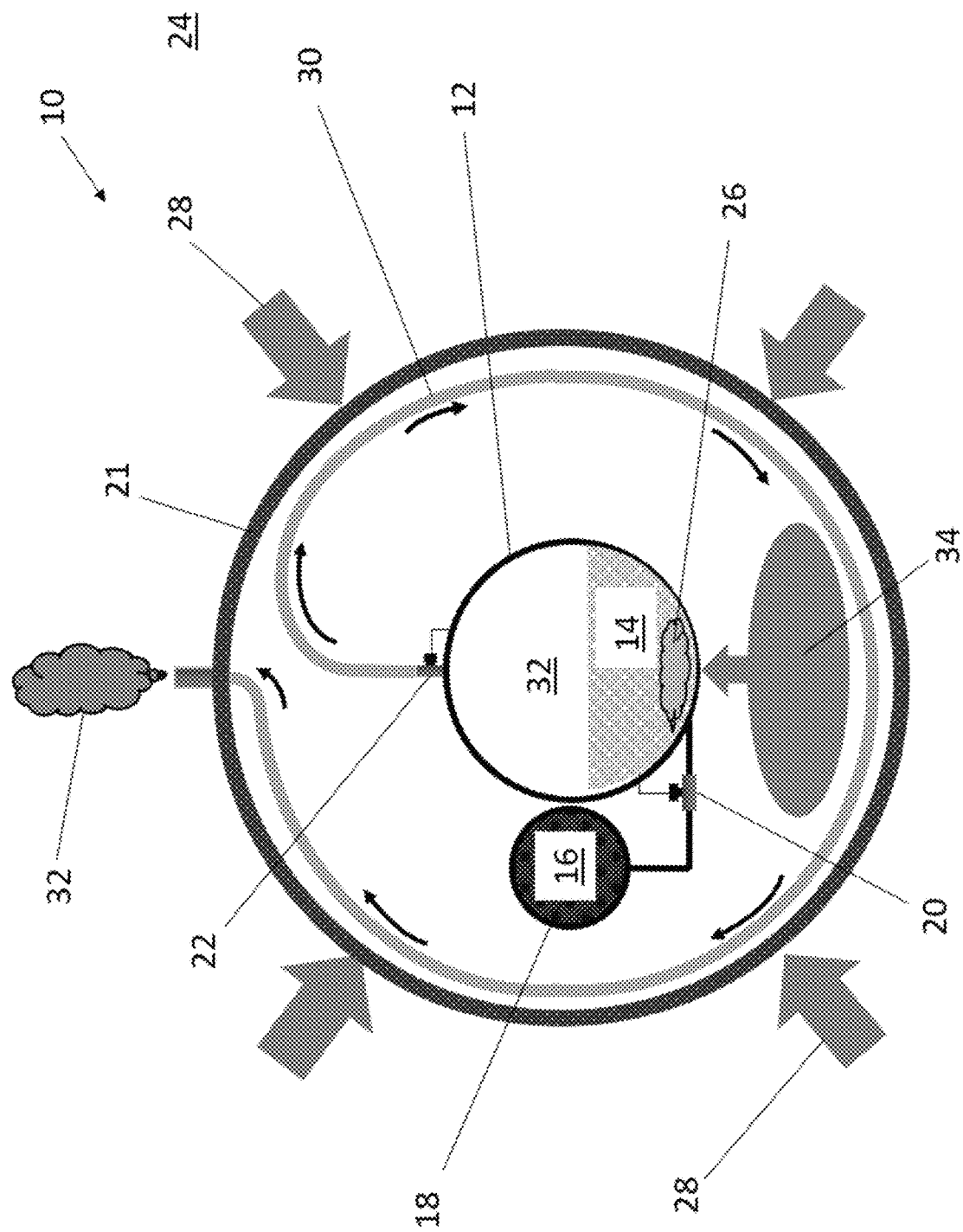
FIG. 1 is a schematic representation of an exemplary thermal management system.

As shown in FIG. 1, the thermal management system 10 includes at least two vessels contained in a vehicle 21, such as a lander or landing vehicle: one primary vessel 12 containing a two-phase working fluid 14 in saturation state and a secondary species 16 (once a refill valve 20 has been opened between primary vessel 12 and secondary vessel 18, bubbles 26 of secondary species 16 shown in FIG. 1) and a secondary vessel 18 containing only the secondary species 16 that has a higher pressure than the pressure in primary vessel 12. The two vessels 12, 18 are coupled via refill valve 20. Venting a mixture 32 of working fluid 14 and secondary species 16 from primary vessel 12 is controlled by a venting valve 22 mounted on the top of primary vessel 12. Both valves 20, 22 can be automatically controlled based on temperature or pressure within primary vessel 12. Thermal management system 10 operates in cycles as shown in FIGS. 2A-2C:

Heat Acquisition—(FIG. 2A)

Initially, the total pressure (vapor saturation pressure and gas partial pressure of working fluid 14) of primary vessel 12 is lower than the ambient pressure of surrounding environment 24 and the liquid temperature in saturation or working fluid 14 is lower than the setpoint temperature of the system. Liquid working fluid 14 within primary vessel 12 acquires heat from internal heat loads 34 (FIG. 1), such as electronic components or devices contained in vehicle 21 and vaporizes. Vapor density increases within the primary vessel 12, building up the total pressure in primary vessel 12. Both valves 20, 22 are closed during the heat acquisition cycle.

Venting—(FIG. 2B)

As the total pressure continues to build, in response to the temperature of working fluid 14 exceeding the set point temperature and the total pressure becoming higher than the environmental pressure of surrounding environment 24, venting valve 22 will open and the mixture of vapor and non-condensable gas will be ejected, which carries latent heat of vaporization and gas sensible heat in working fluid 14. Total pressure of the primary vessel drops until venting valve 22 closes.

Gas Recharging—(FIG. 2C)

Gas refill valve 20 between the two pressure vessels 12, 18 will be opened to allow compressed gas (the secondary species 16) inside the secondary vessel 18 at much higher-pressure charge into primary vessel 12 to rebuild the total pressure to a predetermined pressure P1. The bubbles 26 of compressed gas of secondary species 16 that travel through the liquid phase of working fluid 14 are humidified and therefore, cool the liquid pool. This represents another component of cooling of the liquid pool, in addition to the vaporization during venting. In conclusion, both venting and gas recharging cycles of the process will cause the liquid phase of working fluid 14 to evaporate, releasing a significant amount of latent heat. As a consequence, the liquid temperature of working fluid 14 drops and the system can acquire more heat from the heat sources such as internal heat loads of vehicle 21 (FIG. 1). Optionally, a mixer 60 is provided at the juncture between vessels 12, 18 having features that can enhance mixing of secondary species 16 and the liquid working fluid 14 to enhance humidification of bubbles 26, sometimes referred to as bubble humidification. For example, in one embodiment, mixer 60 incorporates a capillary system, nozzles to spray small bubbles into the liquid working fluid 14, or other features or devices usable to decrease bubble size, extend bubble residence time within the liquid pool and/or increase uniformity of bubble distribution within the pool of liquid working fluid 14. In one embodiment, primary vessel 12 may include an internal coating 62 to increase or promote vaporization of working fluid 14. In one embodiment, primary vessel 12 may include an internal wick structure 70 to control a location of the liquid working fluid 14 within the vessel by capillary action to increase or promote vaporization of working fluid 14.

In certain situations, the temperature of environment 24 (FIG. 2A) can also be higher than the set point temperature (in addition to environmental pressure that is also higher than the primary species saturation pressure at the set point). In this case, the fluid mixture containing saturated vapor of working fluid 14 (primary species) and compressed gas (secondary species 16), before being ultimately vented fluid 32 into the ambient environment 24, still has a certain amount of sensible heat capacity that can be used to collect incoming environment heat leaks 28. To do so, the fluid mixture 32 leaving primary vessel 12 is guided through a heat guard 30, which is a network of flow channels that is integrated with the structure of the vehicle 21, such as along the peripheral structure of vehicle 21 as shown in FIG. 1. The resulting heat guarding will allow the fluid mixture to collect incoming environmental heat leak 28 and reject it back into ambient environment 24.

While the discussion above takes the secondary species 16 as a gas such as an ideal gas, a saturated liquid/vapor, a superheated vapor, saturated vapor, or sub-cooled liquid can also be used to provide the pressure required to vent to the ambient environment. Additionally, using saturated liquid/vapor, or initially subcooled liquid, for example, can shrink the system volume and mass, as well as providing additional heat removal as the liquid is heated up to saturation or supercriticality.

For purposes herein, the term "ideal gas" and the like are intended to mean gas that behave qualitatively like an ideal gas. Many gases such as nitrogen, oxygen, hydrogen, noble gases, and some heavier gases like carbon dioxide can be treated like ideal gases within reasonable tolerances. That is, while the compressibility factor Z is typically defined as unity for an ideal gas, according to the following equation: $Z=pV/RT$ (where p=pressure; V=volume; R=ideal gas constant; T=temperature), for purposes herein, a gas having a compressibility factor Z between 0.9 and 1.1 is considered to be an ideal gas.

EXAMPLES/PROTOTYPES

A mathematical model that describes the venting-based cooling process assisted by a secondary species was developed. Since the process is cyclic as shown in FIGS. 2A-2C, the model divides a cycle of the venting-based cooling process into multiple consecutive stages and calculates thermodynamic states of each component (vapor, liquid and gas) at each stage by solving conservation equations of mass, volume and energy.

Figure 3:
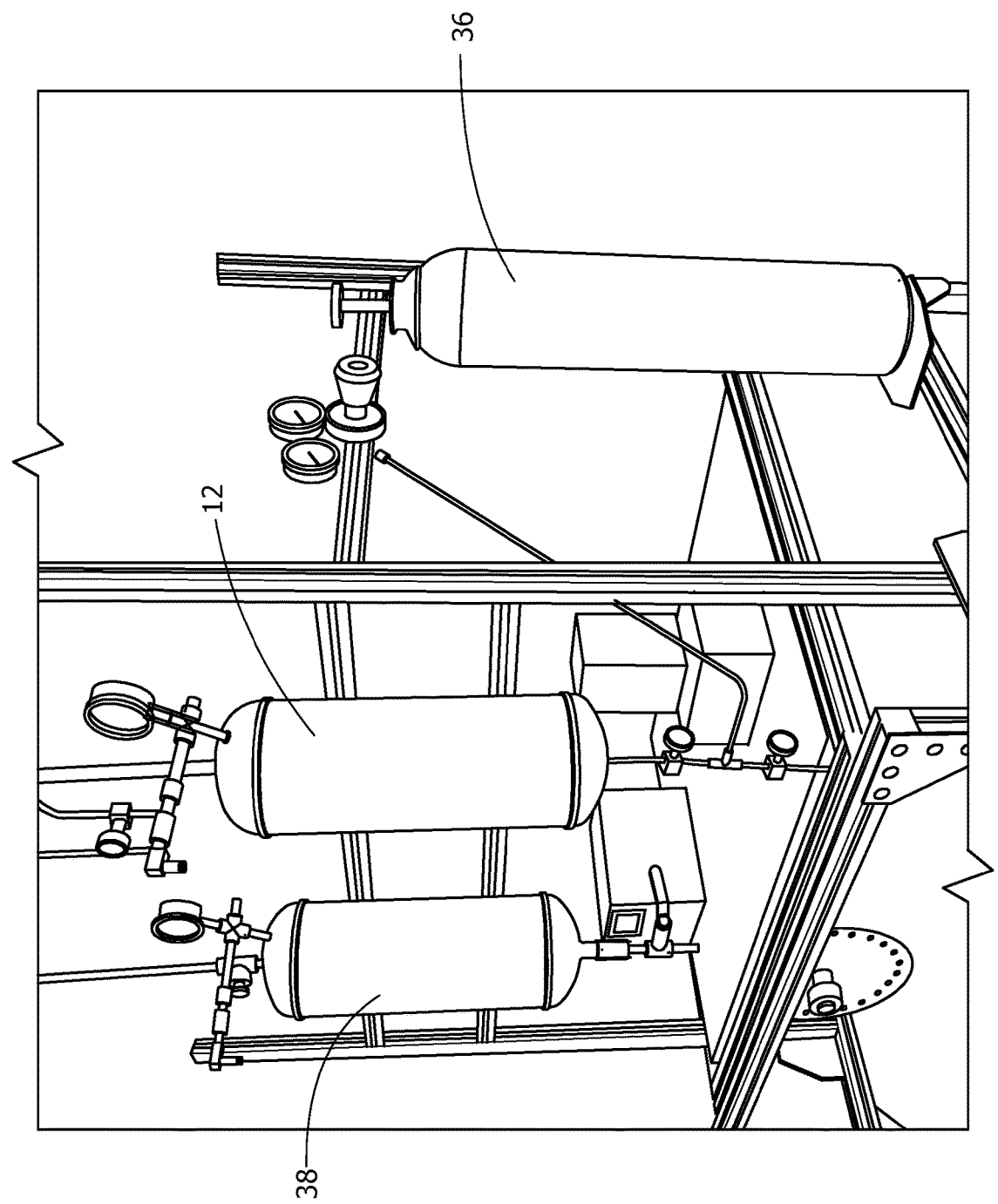
FIG. 3 is a perspective view of an exemplary thermal management system.

As shown in FIG. 3, prototype was designed, built and tested with three different pairs of working fluids 14/secondary species 16, including water/argon, water/helium and ammonia/helium. Two-phase working fluid was contained within the primary vessel 12. Non-condensable compressed gas (secondary species 16) was charged into primary vessel 12 from a compressed gas cylinder 36 to increase the total pressure of the primary vessel 12. Heat was applied to the bottom of primary vessel 12 to warm up the liquid phase of the working fluid 14. The fluid mixture consisting of working fluid 14 vapor and secondary species 16 was vented to another pressure vessel 38 (environmental pressure simulator) that was maintained at a constant pressure and a higher pressure than the vapor pressure corresponding to the set point. Venting and gas recharging were manually controlled by tracking pressure and/or temperature of primary vessel 12.

Figure 4:
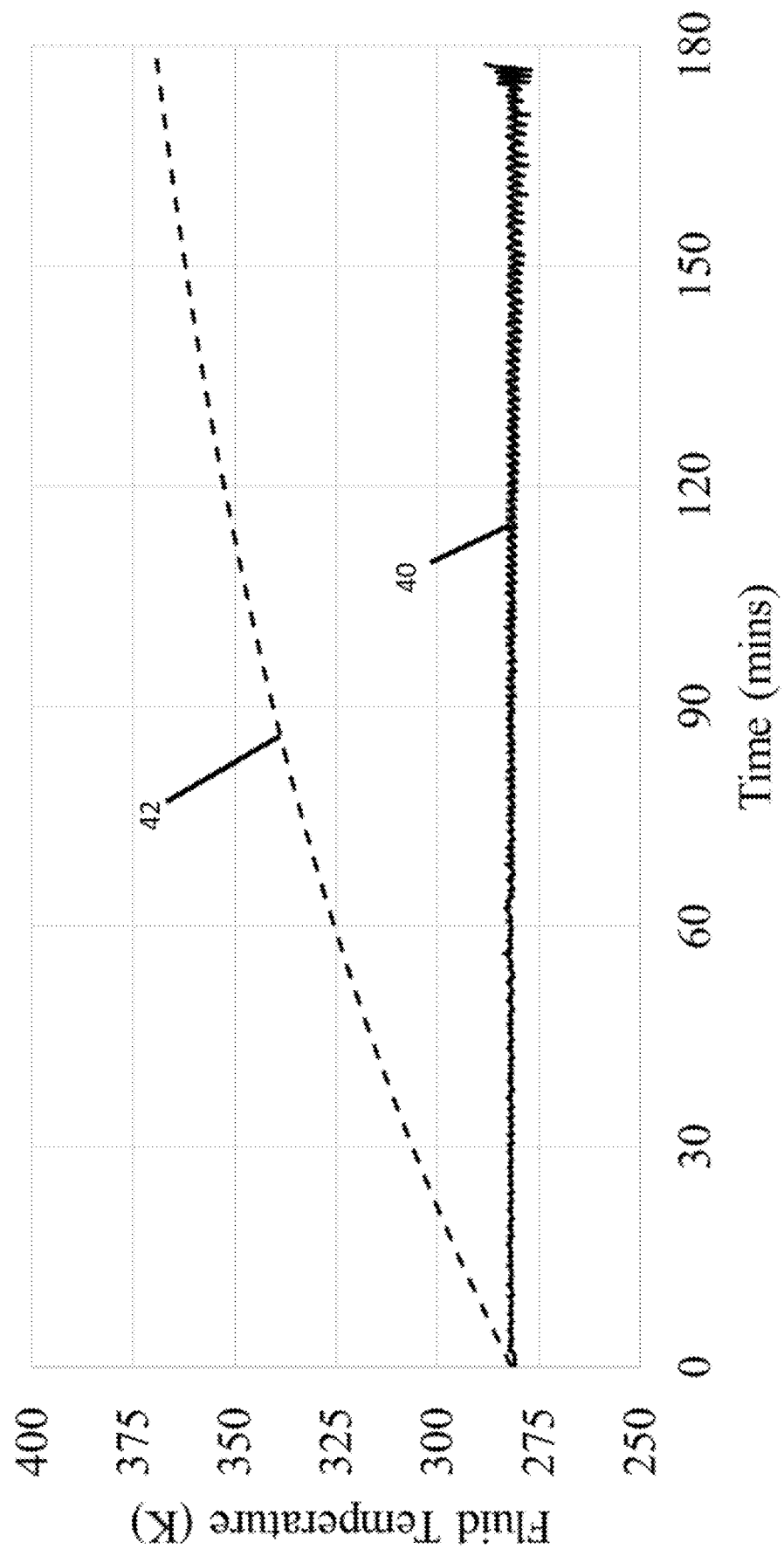
FIG. 4 is a graphical representation of test results as a measure of temperature versus time.

Ammonia/helium test results are graphically shown in FIG. 4. As a measure of temperature versus time, with 100 W of net heat input, as line 40 shows, ammonia liquid temperature was successfully maintained at the set point of 8.8° C. (281.9 K) for three hours by venting fluid mixture into an environment with a pressure of 100 psia, that was higher than the vapor pressure of ammonia at 8.8° C. (~82 psia). Without the venting operation as shown by dashed line 42, liquid temperature after three hours of 100 W heat input would have reached 100° C. (373 K).

Figure 5:
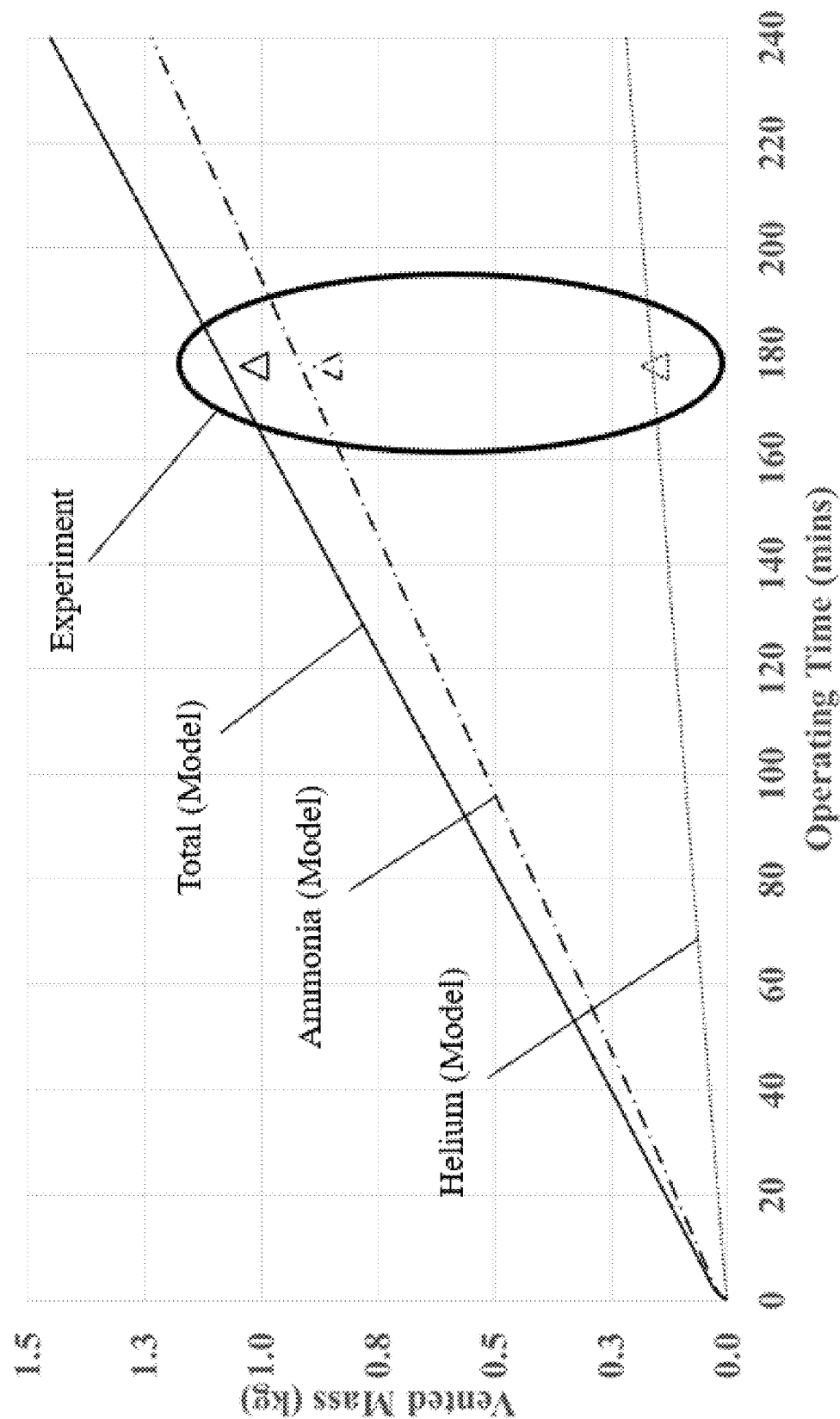
FIG. 5 is a graphical representation of the test results of FIG. 4.

As FIG. 5 graphically shows, total vented mass of both species (collectively, working fluid 14 and secondary species 16 from vessels 12, 18 (FIG. 1)) after three hours of operation were measured and compared with model predictions. The prototype vented 0.86 kg of ammonia and 0.16 kg of helium to reject 100 W of heat input for 3 hours. The predicted mass consumption agreed well with the measurement. Based on energy analysis, 99.97% of heat input was removed by latent heat of working fluid (ammonia).

Figure 6:
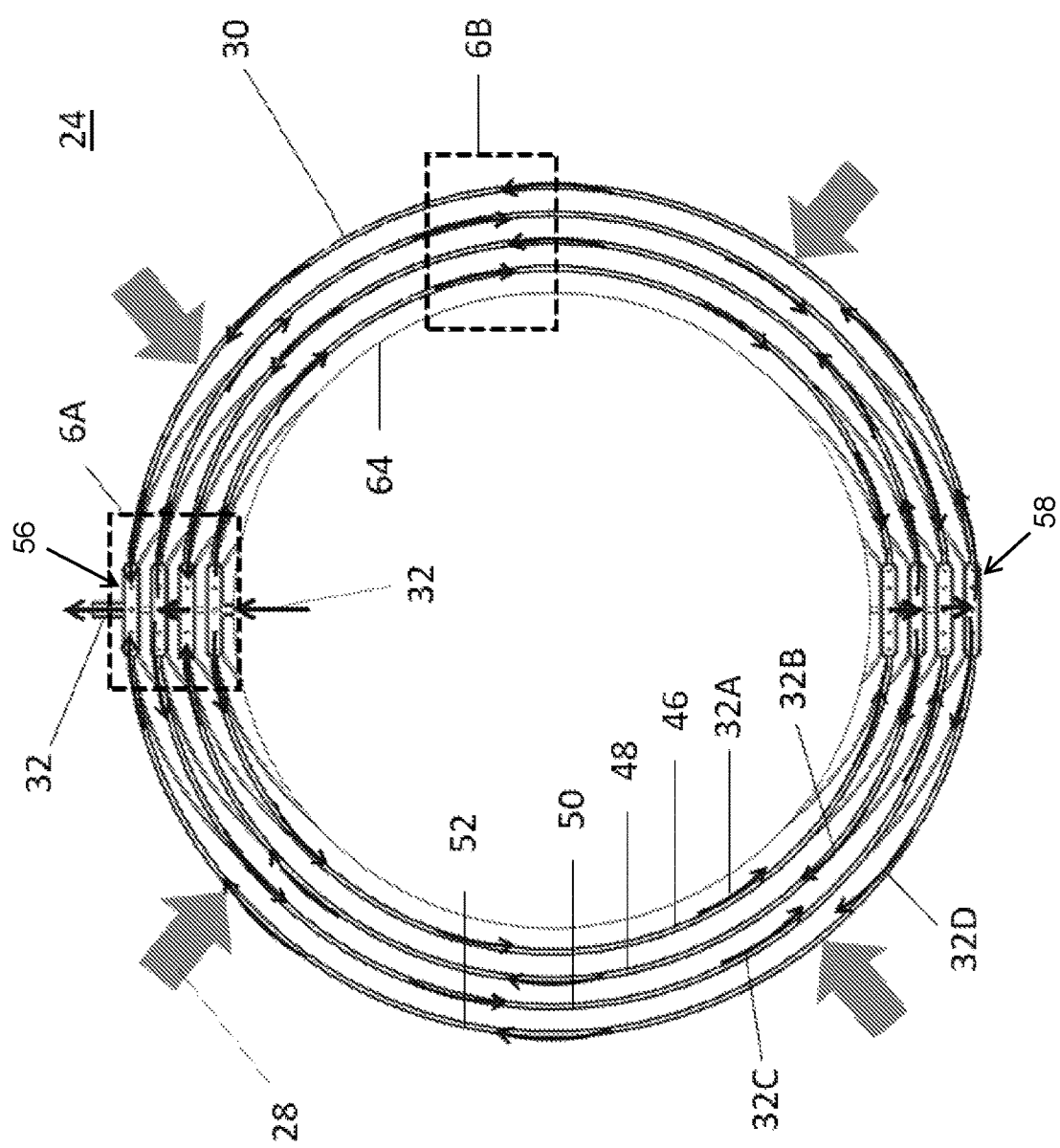
FIG. 6 is a schematic representation of an exemplary heat guard.
Figure 6A:
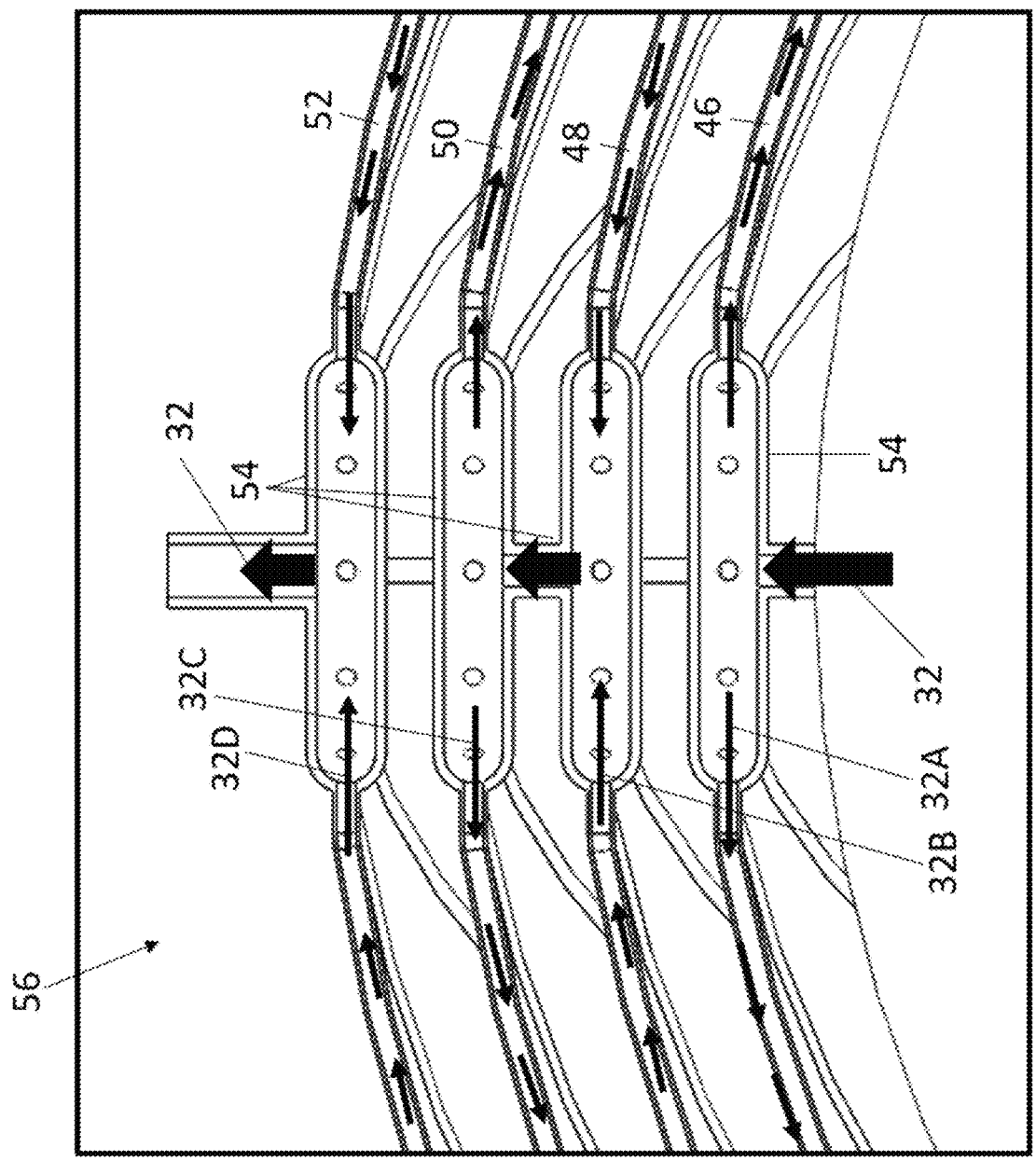
FIG. 6A is an enlarged portion of the exemplary heat guard taken from region 6A of FIG. 6.

A multi-layer heat guarding or heat guard 30 was designed to minimize incoming environmental heat leaks or heat incoming from the environment. As FIGS. 6 and 6A-6B collectively show, heat guard 30 includes multiple thin and thermally conductive layered members 64 or flanges or shells extending along an outer periphery with a network of embedded pipelines or flow channels 46, 48, 50, 52. Fluid mixture 32 leaving or being vented from primary vessel 16 (FIG. 1) flows into a flow outlet coupling such as a manifold 54 (FIG. 6A) and then each flow mixture portion 32A of fluid mixture 32 is directed to travel globally from the north pole position 56 to the south pole position 58 at the 1st layer or corresponding flow channel 46, then each flow mixture portion 32A flows into manifold 54 at position 58 at the 1st layer or corresponding flow channel 46, becoming flow mixture portion 32B and then each flow mixture portion 32B flows into manifold 54 that is in fluid communication with the 2nd layer or corresponding flow channel 48, traveling globally from south pole position 58 to north pole position 56. The fluid mixture portions 32C and 32D of fluid mixture 32 then travels through the successive 3rd and 4th layers or corresponding flow channels 50, 52 via corresponding manifolds 54 in opposite overlapping flow directions until being ultimately vented into the ambient environment 24. In other embodiments, a different number of flow channels than four may be used.

Figure 6B:
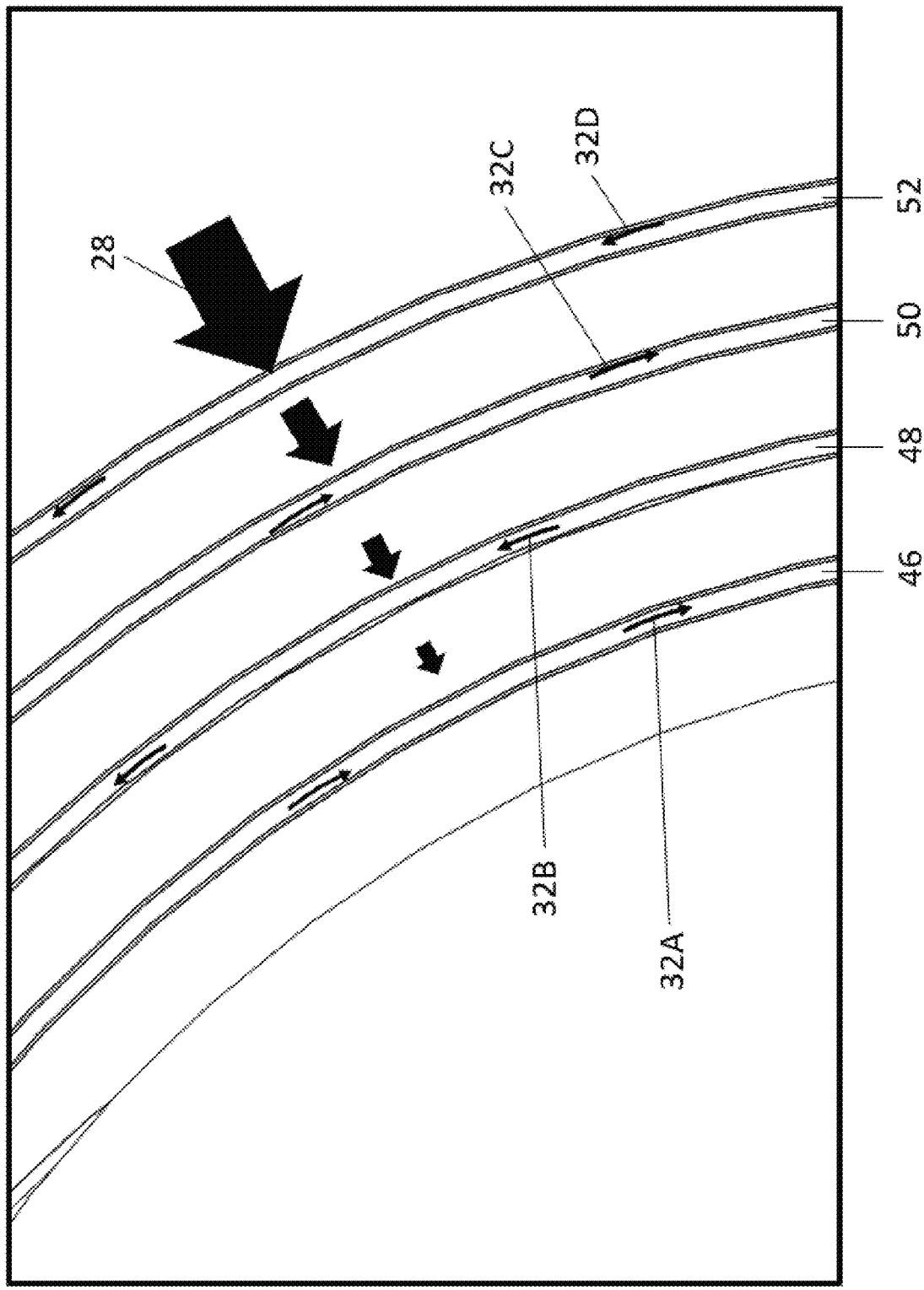
FIG. 6B is an enlarged portion of the exemplary heat guard taken from region 6B of FIG. 6.

As further shown in FIG. 6B, incoming environmental heat leaks 28 exchange heat with flow mixture portion 32D at flow channels 52, then exchange heat with flow mixture portion 32C at flow channels 50, then exchange heat with flow mixture portion 32B at flow channels 48, and then exchange heat with flow mixture portion 32C at flow channels 50. As shown schematically in FIG. 6B, in response to incoming environmental heat leaks 28 exchanging heat with flow mixture portions 32D, 32C, 32B, 32A in respective successive flow channels 52, 50, 48, 46, the flow mixture 32 (FIGS. 6, 6A) being vented from the heat guard 30 (FIG. 6), it is appreciated that the incoming environmental heat leaks 28 are diminished.

Figure 7:
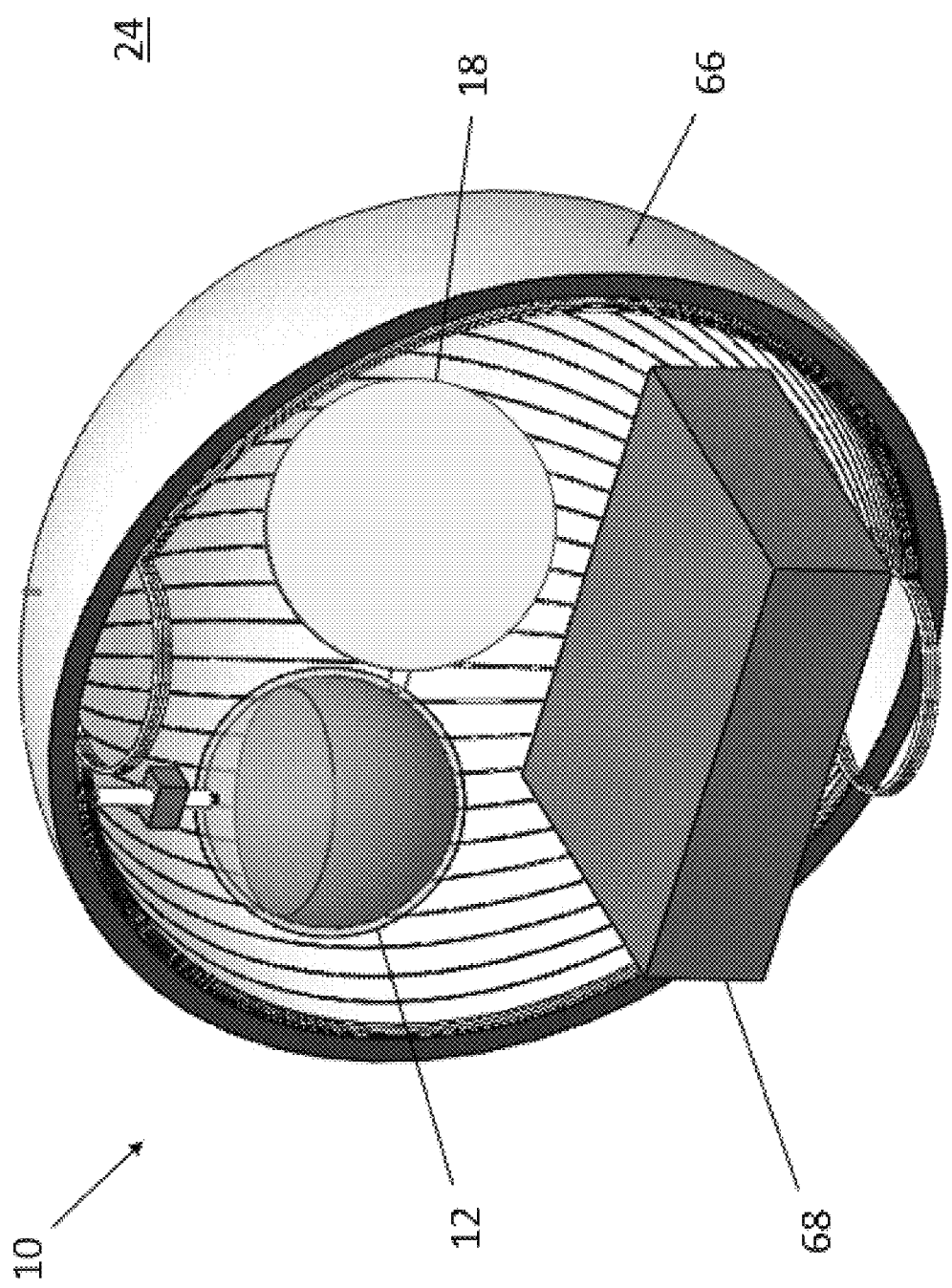
FIG. 7 is an upper perspective cutaway view of an exemplary thermal management system.

The secondary fluid can also be a saturated liquid/vapor mix, or an initially subcooled liquid. These alternate physical states of the secondary fluid can reduce the system volume and mass, and/or extend the cooling period compared to the secondary fluid being a gas. One configuration for using ammonia and hydrogen liquid is shown in FIG. 7, in which in one embodiment of a thermal management system 10, hydrogen is contained in primary vessel 12 and ammonia is contained in secondary vessel 18 that are surrounded in a shell 66, such as for a celestial body lander for cooling the interior of the shell from one or more of a surrounding environment 24 and/or a heat source 68 positioned interior of shell 66.

Figure 8:
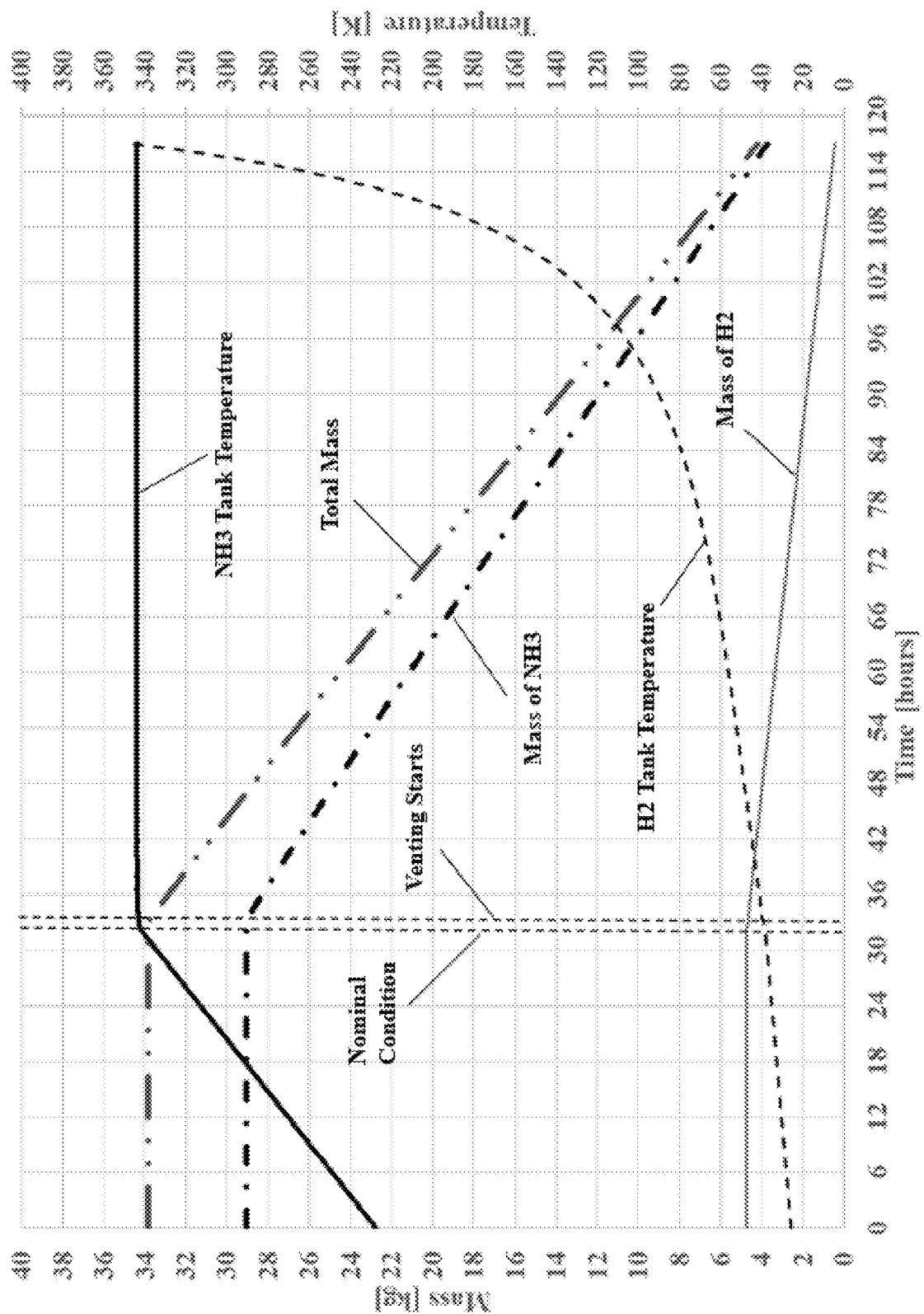
FIG. 8 is a graphical representation of test results as a measure of temperature and vented mass versus time.
Figure 9:
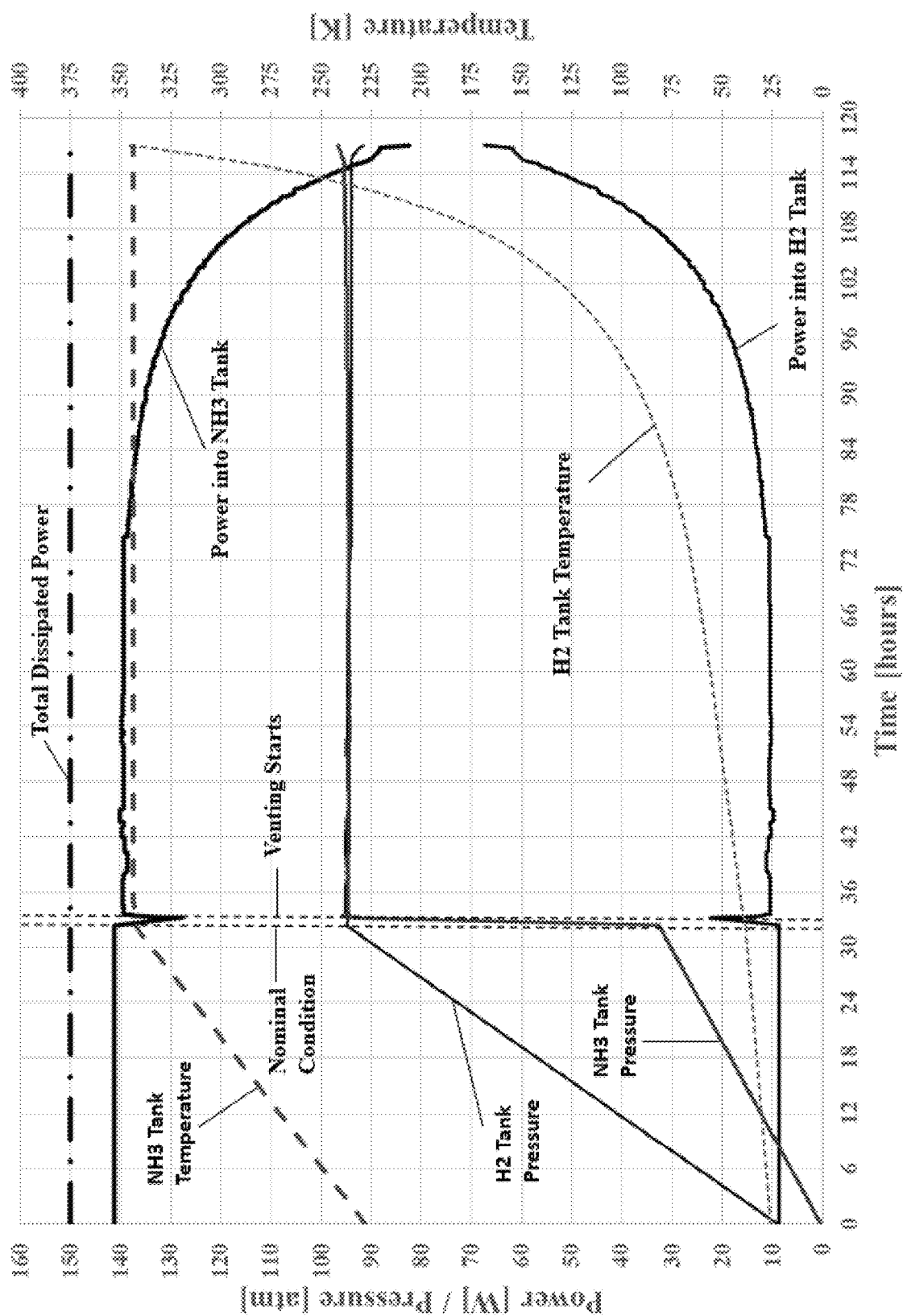
FIG. 9 is a graphical representation of the test results of FIG. 8.

Both hydrogen and ammonia fluids are initially subcooled below their saturated state at their initial temperature. In one embodiment, the hydrogen is initially a pressurized liquid at 26K and 9 atm, and the ammonia is precooled below the operating temperature to 228K (−45° C.). As shown in FIG. 8, which graphically shows a temperature versus time scenario replicating environmental conditions on the surface of Venus, no fluids are vented for approximately the first 32 hours, while the temperature of the vessels or tanks containing hydrogen and ammonia increases. Pressures, temperatures, and the amount of power (such as from heat transfer devices) accepted by both heat sinks (i.e., hydrogen and ammonia vessels or tanks) are shown in FIG. 9.

During the initial warmup time, both the ammonia and hydrogen vessels or tanks accept heat that increase their temperatures and pressures. At approximately 32 hours, the hydrogen pressure is sufficiently increased, permitting the hydrogen to be used to vent ammonia into the Venus environment.

Figure 10:
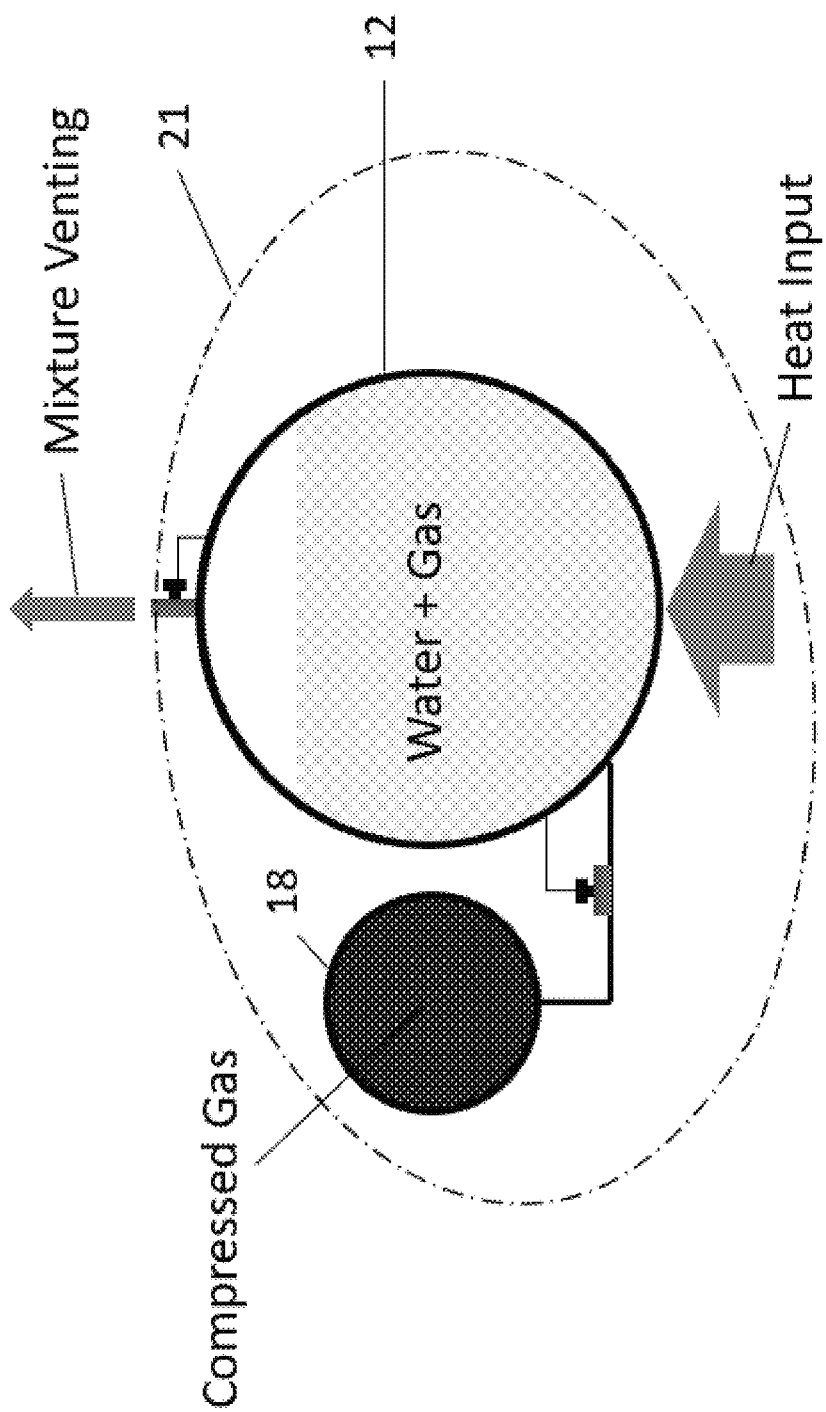
FIG. 10 is a schematic representation of an exemplary thermal management system.

The concept can also be used to cool a vehicle 21 such as an aircraft and materiel electronics, as well as any other system where the current heat sinks are absent or limited; see FIG. 10. Potential venting fluids contained in primary vessel 12 include water and mixtures such as water and methanol, which freeze at a lower temperature. Compressed gases or secondary species contained in secondary vessel 18 include, but are not limited to, nitrogen and/or air. Saturated or subcooled liquids can also be used as the secondary species as previously discussed.

Figure 11:
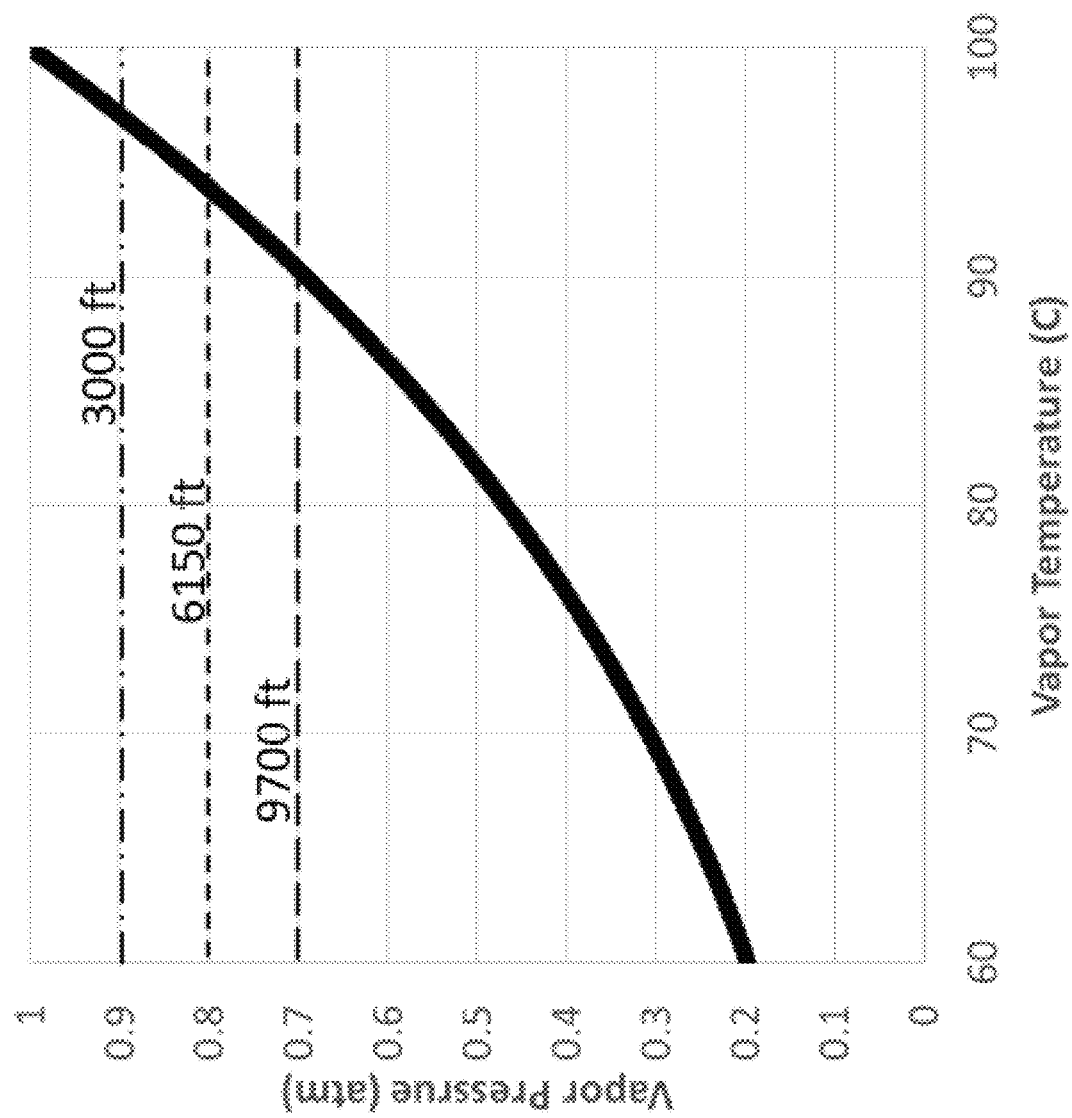
FIG. 11 is a graphical representation of test results as a measure of vapor pressure versus vapor temperature.

FIG. 11 shows the saturated water vapor pressure as a function of temperature, and the elevation where the vapor pressure is equal to that corresponding to the ambient pressure at elevation pressure. Note that the total pressure must be higher than the ambient pressure at elevation pressure in order to vent the fluid gas mixture to ambient, with the difference increasing as the flow rate increases.

Figure 12:
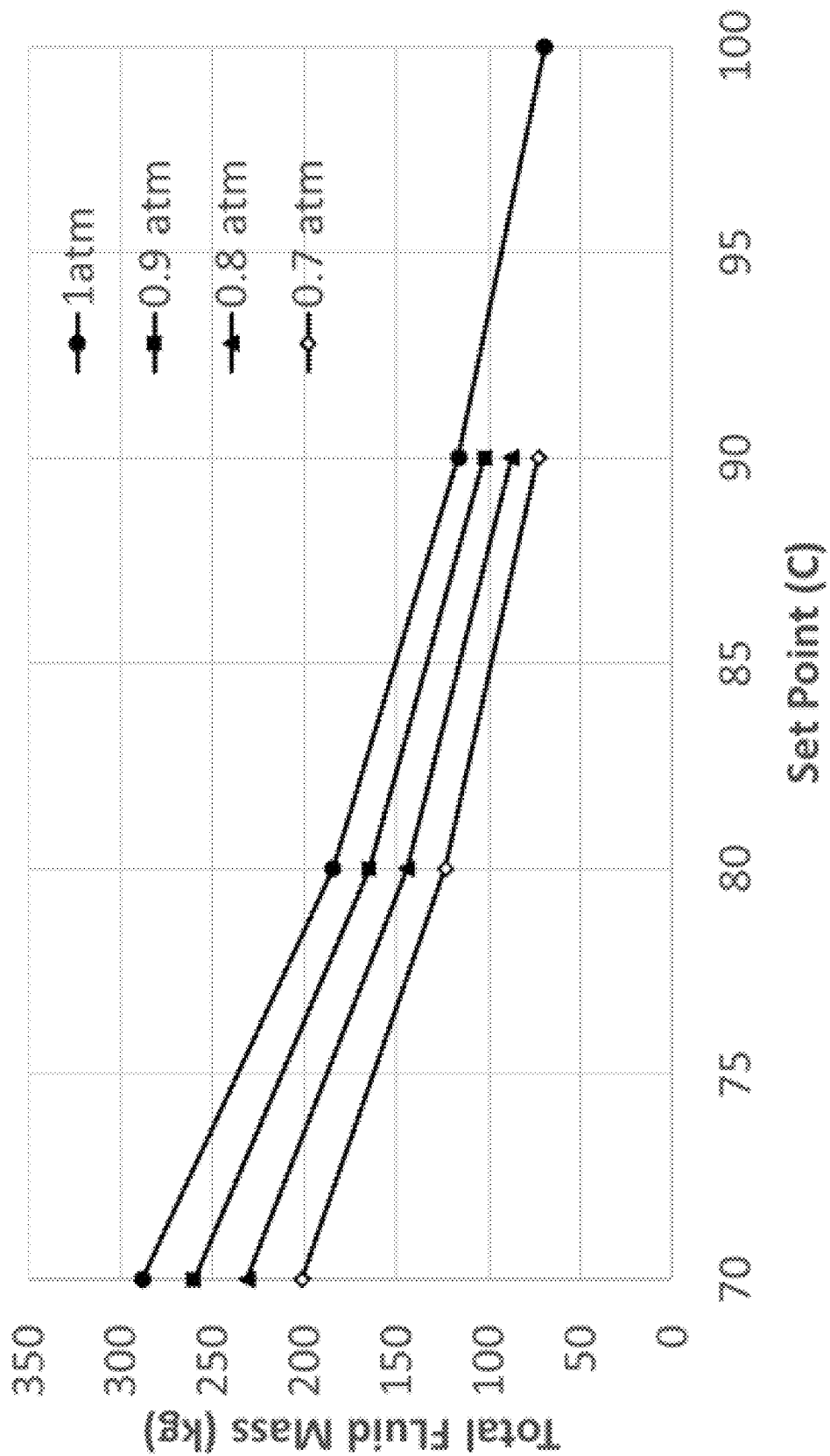
FIG. 12 is a graphical representation of test results as a measure of fluid mass versus set point temperature.
Figure 13:
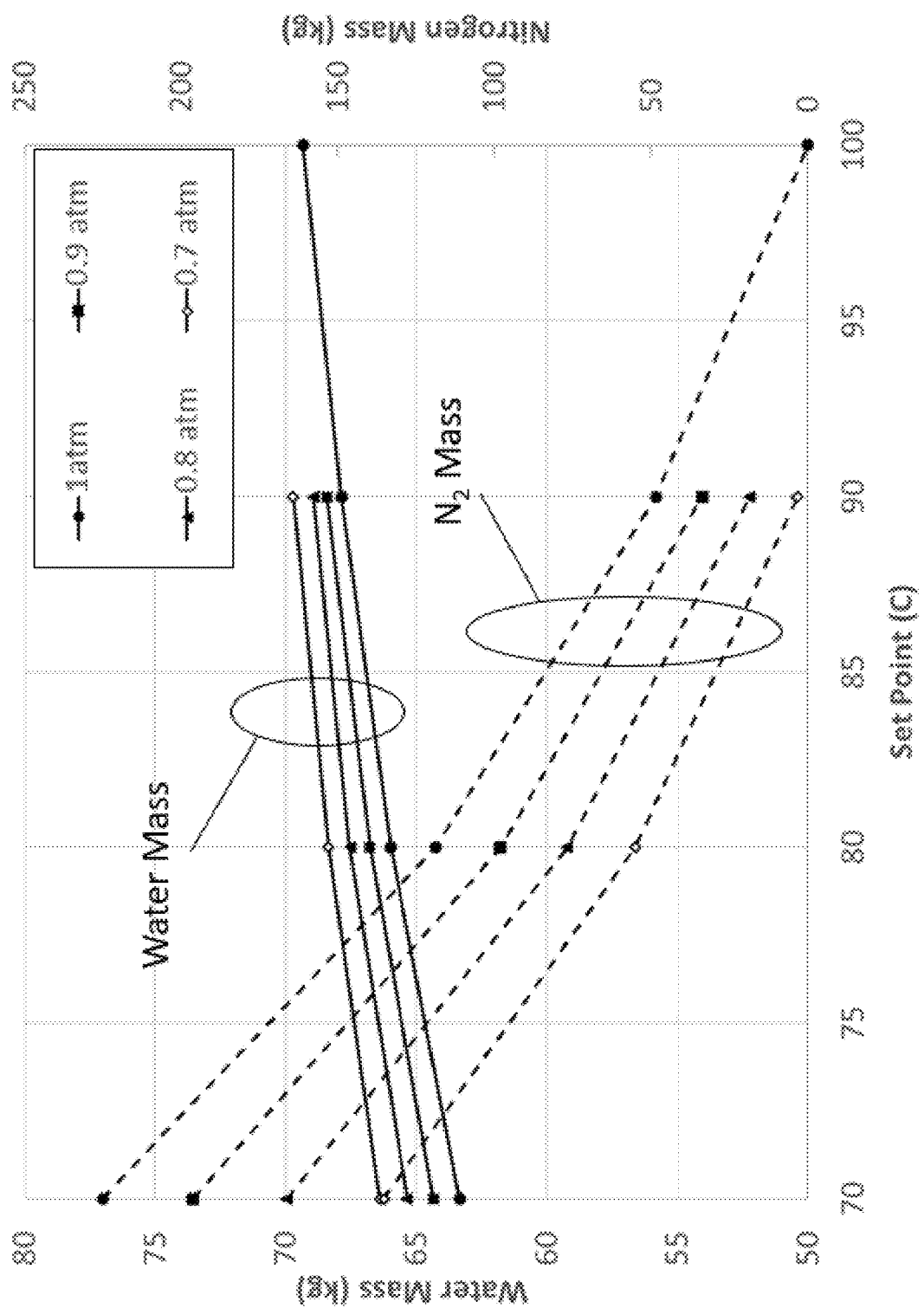
FIG. 13 is a graphical representation of the test results of FIG. 12.

FIG. 12 shows the total mass of nitrogen and water vented as a function of elevation, assuming a 50 kW heat load applied for 1 hour, while FIG. 13 shows the masses of the nitrogen and the water separately. As the venting temperature (and water vapor pressure) increases, the ratio of vented water to nitrogen increases, and the total vented mass is reduced.

When water is used as the primary fluid, the higher the heat rejection temperature, the less total mass is required. However, some aircraft electronics require a lower temperature to operate effectively. An example is laser diodes, which typically are designed to operate near 25° C.

The current concept can cool such devices through the assistance of a heat pump to raise or boost the temperature from the electronics and supply the power at higher temperatures to the venting system in an aircraft. Potential other assisting systems include vapor compression systems and, thermoelectric systems.

This novel arrangement allows working fluid to be vented into an ambient environment that has a higher pressure than the vapor pressure corresponding to the set point of the working fluid, while also saving a significant amount of system mass compared to PCM-based solutions. The invention offers passive operation with no energy needs, reliability (e.g., no moving parts except valves), simplicity and reduced mass. The invention system will enable a celestial body lander to operate and survive in extreme environments having high surface temperatures for an extended period of time with low system mass. The technology may also be used with other celestial body applications for thermal management systems where refrigeration through venting of a working fluid into an environment having a higher pressure than the fluid saturation pressure of the working fluid may be utilized.

For non-space related applications, the invention can be applied to a wide range of systems that typically have previously relied on Phase Change Materials for mid-term temperature control. Examples include electronics on rockets, with no heat sink available, and on high-performance aircraft (including subsonic, supersonic, and hypersonic), with limited heat sinks. If the desired setpoint temperature is below 100° C., water cannot be directly vented from a boiler to cool electronics on the ground, only at high elevations, where the atmospheric pressure is lower. The current device will allow venting to occur, even at sea level. Another benefit is that the system can be reused, just by refilling or replenishing the primary and secondary tanks with respective working fluid and secondary species, such as with refilling valves as previously discussed or other specially designated refilling valves.

A refrigeration system that uses a secondary species to increase the total pressure of the primary vessel so that the saturated vapor of working fluid can be vented into a higher-pressure environment to achieve cooling to a heat source.

The device described above includes a primary venting vessel, which contains two-phase working fluid and the secondary species and one or more secondary vessels containing secondary species with a higher pressure than the primary vessel.

The device described above, wherein the heat can be applied to the primary vessel and/or other secondary vessels through heat transfer devices.

The device described above, wherein the secondary species enters the primary vessel from secondary vessels to increase the total pressure of primary vessel. Charging of secondary species is controlled by a valve.

The device described above, wherein the mixture of working fluid in saturation state and secondary species vents into the ambient environment via valves mounted on the primary vessel. Venting of the fluid mixture is controlled based on temperature and/or pressure set point.

The device described above, wherein the primary vessel includes internal surface having capillary structure to increase the liquid free surface within the vessel.

The device described above, wherein the fluid vented out of the primary vessel can be used to store the incoming heat leaks of environment as sensible heat before being ultimately vented into the environment.

The device described above uses working fluid that has vapor density higher, lower or equal to compressed gas density, so that distribution of the gas phases within the primary vessel can be uniform or non-uniform (i.e., gas phase stratification).

The device described above in which heat is supplied to the primary and secondary vessels as a result of any of conduction from electronics or other internal heat loads, by a single-phase pumped loop, by a two-phase pumped loop, and/or by heat pipes.

The device described above has features that can enhance the mixing between the compressed gas and the liquid pool in saturation. For example, compressed gas bubbles injected from secondary vessels can be humidified and their latent heat of vaporization absorbed as soon as they enter the primary vessel. Features to enhance bubble humidification can be devices that will decrease bubble sizes, increase residency duration under free surface, multiple points injection, and tangential injection to induce vortices.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermal management system adapted to vent a working fluid into an environment having a higher pressure than a vapor pressure of the working fluid corresponding to a set point of the system comprising:
    a secondary vessel containing a secondary species;
    a primary vessel containing the working fluid and the secondary species;
    at least one valve to selectively control venting of a mixture of the working fluid and the secondary species from the primary vessel to the environment; and
    at least one valve connected between the primary vessel and the secondary vessel to selectively control charging of the secondary species into the primary vessel;
    wherein the secondary species is taken from the group consisting of an ideal gas, a saturated vapor, a superheated vapor, and a second saturated gas/liquid mixture, each secondary species having a higher pressure than a pressure of a liquid phase of the working fluid in the primary vessel.

2. The thermal management system of claim 1, wherein a gas/vapor phase distribution of the mixture of the working fluid and the secondary species within the primary vessel is non-uniform.

3. The thermal management system of claim 1 further comprises a mixer for mixing the secondary species and a liquid phase of the working fluid.

4. The thermal management system of claim 1, wherein the primary vessel has an internal coating to increase vaporization of the working fluid.

5. The thermal management system of claim 1, wherein the primary vessel has an internal wick structure to control a location of a liquid phase of the working fluid within the primary vessel by capillary action.

6. The thermal management system of claim 1 further comprises a flow outlet coupling to a plurality of flow channels in the primary vessel for permitting collection of heat incoming from the environment before the mixture of working fluid and the secondary fluid being vented into the environment.

7. The thermal management system of claim 6, wherein the plurality of flow channels are flanges or shells.

8. The thermal management system of claim 6, wherein the plurality of flow channels have multiple layers.

9. The thermal management system of claim 1, wherein heat is supplied to the primary vessel and the secondary vessel by one or more of the following: conduction from internal heat loads, by a single-phase pumped loop, by a two-phase pumped loop, and by heat pipes.

10. The thermal management system of claim 1, wherein the working fluid and the secondary species are replenishable in the primary vessel and the secondary vessel.

11. The thermal management system of claim 1, wherein the secondary species is initially a subcooled liquid.

12. The thermal management system of claim 1, wherein the working fluid is water.

13. The thermal management system of claim 1, wherein the working fluid is water and methanol.

14. The thermal management system of claim 1, wherein the working fluid is ammonia.

15. The thermal management system of claim 1, wherein the secondary species is nitrogen or air.

16. The thermal management system of claim 1, wherein the secondary species is helium.

17. The thermal management system of claim 1, wherein the secondary species is hydrogen gas.

18. The thermal management system of claim 1, wherein the secondary species is saturated hydrogen.

19. A thermal management system adapted to vent a working fluid into an environment having a higher pressure than a vapor pressure of the working fluid corresponding to a set point of the system comprising:
    a secondary vessel containing a secondary species;
    a primary vessel containing the working fluid and the secondary species;
    at least one valve to selectively control venting of a mixture of the working fluid and the secondary species from the primary vessel to the environment; and
    at least one valve connected between the primary vessel and the secondary vessel to selectively control charging of the secondary species into the primary vessel;
    wherein the primary vessel and the secondary vessel act as heat sinks by acquiring heat from heat sources.

20. A thermal management system adapted to vent a working fluid into an environment having a higher pressure than a vapor pressure of the working fluid corresponding to a set point of the system comprising:
    a secondary vessel containing a secondary species;
    a primary vessel containing the working fluid and the secondary species;
    at least one valve to selectively control venting of a mixture of the working fluid and the secondary species from the primary vessel to the environment; and
    at least one valve connected between the primary vessel and the secondary vessel to selectively control charging of the secondary species into the primary vessel;
    wherein a gas/vapor phase distribution of the mixture of the working fluid and the secondary species within the primary vessel is uniform.

* * * * *